(12) United States Patent
Imai

(10) Patent No.: US 11,738,982 B2
(45) Date of Patent: Aug. 29, 2023

(54) LIQUID SUPPLY DEVICE AND CONTROL METHOD FOR LIQUID SUPPLY DEVICE

(71) Applicant: Surpass Industry Co., Ltd., Gyoda (JP)

(72) Inventor: Hiroshi Imai, Saitama (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 17/870,042

(22) Filed: Jul. 21, 2022

(65) Prior Publication Data
US 2023/0030810 A1 Feb. 2, 2023

(30) Foreign Application Priority Data

Jul. 30, 2021 (JP) ................................ 2021-125452

(51) Int. Cl.
| | |
|---|---|
| *B67C 3/34* | (2006.01) |
| *B25J 9/16* | (2006.01) |
| *B25J 13/08* | (2006.01) |
| *B67D 7/02* | (2010.01) |
| *F16J 13/24* | (2006.01) |

(52) U.S. Cl.
CPC ............... *B67C 3/34* (2013.01); *B25J 9/1612* (2013.01); *B25J 9/1664* (2013.01); *B25J 13/08* (2013.01); *B67D 7/0288* (2013.01); *F16J 13/24* (2013.01)

(58) Field of Classification Search
CPC ........ B67C 3/34; B67D 7/0288; B25J 9/1612; B25J 9/1664; B25J 13/08; F16J 13/02; F16J 13/24
See application file for complete search history.

(56) References Cited

U.S. PATENT DOCUMENTS

| | | | | |
|---|---|---|---|---|
| 6,053,219 | A * | 4/2000 | Seiver ................... | G01G 17/06 141/83 |
| 6,543,494 | B2 * | 4/2003 | Bellin ....................... | B67C 3/30 141/192 |
| 6,725,890 | B1 * | 4/2004 | Green ....................... | B65B 3/28 141/168 |
| 6,863,092 | B2 * | 3/2005 | Seiver ...................... | B67C 3/30 141/2 |
| 8,210,204 | B2 * | 7/2012 | Hasunuma .............. | F16L 37/35 137/553 |
| 8,342,209 | B2 * | 1/2013 | Hasunuma .............. | F16L 37/36 138/90 |
| 9,868,215 | B2 * | 1/2018 | Suzuki ................... | B25J 9/1612 |

(Continued)

FOREIGN PATENT DOCUMENTS

JP 2018-020793 A 2/2018

*Primary Examiner* — Nicolas A Arnett
(74) *Attorney, Agent, or Firm* — McCormick, Paulding & Huber PLLC

(57) ABSTRACT

Provided is a liquid supply device including: a plug having a plug side liquid channel; and a socket having a socket side liquid channel. The plug has a groove having a fixing groove, the socket has a body having the socket side liquid channel, a gripping unit gripped by a robot, and a sleeve member configured to adjust a position of the body relative to the gripping unit, the tip of the body runs annularly about the socket axis and has lock balls, and the sleeve member switches a state between a connected state where the lock balls are secured in the fixing groove and a released state where the lock balls are not secured in the fixing groove.

7 Claims, 14 Drawing Sheets

(56) References Cited

U.S. PATENT DOCUMENTS

| | | | |
|---|---|---|---|
| 10,807,744 B1* | 10/2020 | Seiver | B67B 3/204 |
| 11,047,515 B2* | 6/2021 | Imai | F16L 37/32 |
| 11,559,900 B2* | 1/2023 | Correll | B25J 15/10 |
| 11,565,422 B2* | 1/2023 | Ooba | B25J 9/0093 |
| 2003/0196723 A1* | 10/2003 | Ozawa | B67D 7/0288 |
| | | | 141/326 |
| 2008/0247844 A1* | 10/2008 | Hartrampf | B21J 15/32 |
| | | | 901/30 |
| 2009/0302597 A1* | 12/2009 | Takanohashi | B67D 7/3209 |
| | | | 285/29 |
| 2019/0299350 A1* | 10/2019 | Sakai | B25J 9/1633 |
| 2021/0283771 A1* | 9/2021 | Ijiri | B25J 13/088 |
| 2022/0002132 A1* | 1/2022 | Ray | B67D 1/0805 |
| 2022/0380190 A1* | 12/2022 | Imai | B67C 3/34 |
| 2023/0030810 A1* | 2/2023 | Imai | B67C 3/34 |

* cited by examiner

LIQUID SUPPLY DEVICE AND CONTROL METHOD FOR LIQUID SUPPLY DEVICE

CROSS-REFERENCE TO RELATED APPLICATION

This application claims foreign priority benefits under U.S.C. § 119 to Japanese Patent Application No. 2021-125452 filed on Jul. 30, 2021, the content of which is hereby incorporated by reference in its entirety.

BACKGROUND

1. Technical Field

The present disclosure relates to a liquid supply device and a control method of a liquid supply device.

2. Description of Related Art

Conventionally, a liquid supply device that supplies a liquid contained in a liquid storage container to a plurality of supply target devices is known (for example, see Japanese Patent Application Laid-Open No. 2018-20793).

The liquid supply device disclosed in Japanese Patent Application Laid-Open No. 2018-20793 couples a liquid channel formed in a plug and a liquid channel formed in a socket to each other by fixing the plug to an opening of a liquid storage container and attaching the socket to the plug. When attaching the socket to the plug, a worker engages an external thread formed in an attaching nut of the socket with an internal thread part formed in the plug.

The liquid supply device disclosed in Japanese Patent Application Laid-Open No. 2018-20793 requires a worker to perform work to grip the socket and attach the socket to the plug when coupling the liquid channel formed in the plug and the liquid channel formed in the socket to each other. This may increase a work burden on the worker, and the worker may be exposed to a hazard when handling a hazardous liquid.

Accordingly, to prevent an increase in the work burden on the worker or exposure of the worker to a hazard, it is conceivable to use a robot hand configured to grip a socket and automate the work of attaching the socket to a plug. For example, it is conceivable to store in advance the position of the plug disclosed in Japanese Patent Application Laid-Open No. 2018-20793 and move the socket to the stored position by using the robot hand.

To fix a socket to a plug by such a robot hand configured to grip the socket, however, a robot hand that exerts excessively large driving force for fixing the socket to the plug is required. Further, to accurately position a socket with respect to a plug by a robot hand, the robot hand is required to grip the socket with excessively large gripping force so that the attitude of the socket does not change.

SUMMARY

The present disclosure has been made in view of such circumstances, and an object of the disclosure is to provide a liquid supply device and a control method of the liquid supply device that can fix a socket side fixing part of a socket to a plug side fixing part of a plug to connect a socket side liquid channel to a plug side liquid channel without using a gripping mechanism that exerts excessively large driving force and gripping force.

To achieve the above object, the present disclosure employs the following solutions.

A liquid supply device according to one aspect of the present disclosure is a liquid supply device including: a plug fixed to an opening provided to an upper surface of a liquid storage container and having a plug side liquid channel extending along a plug axis; and a socket detachably attached to the plug and having a socket side liquid channel extending along a socket axis. The plug has a groove extending annularly about the plug axis and having a plug side fixing part, the socket has a body formed cylindrically along the socket axis and having the socket side liquid channel, a gripping unit formed cylindrically along the socket axis and gripped by a gripping mechanism configured to grip the socket, and an adjustment unit configured to adjust a position on the socket axis of the body relative to the gripping unit, a tip of the body runs annularly about the socket axis and has a socket side fixing part, and the adjustment unit switches a state between a connected state where the socket side fixing part is fixed to the plug side fixing part and the socket side liquid channel is connected to the plug side liquid channel and a released state where the socket side fixing part is not fixed to the plug side fixing part.

According to the liquid supply device of one aspect of the present disclosure, the gripping unit of the socket is gripped by the gripping mechanism, and the tip of the body having the socket side liquid channel is inserted in the groove extending annularly about the plug axis. The adjustment unit causes the socket to be switched between a connected state where the socket side fixing part is fixed to the plug side fixing part and the socket side liquid channel is connected to the plug side liquid channel and a released state where the socket side fixing part is not fixed to the plug side fixing part.

According to the liquid supply device of one aspect of the present disclosure, since the adjustment unit of the socket adjusts the position on the socket axis of the body relative to the gripping unit and thereby the released state is switched to the connected state, the gripping mechanism that grips the socket is not required to apply, to the socket, driving force for fixing the socket to the plug. It is thus possible to fix the socket side fixing part of the socket to the plug side fixing part of the plug to connect the socket side liquid channel to the plug side liquid channel without using a gripping mechanism that exerts excessively large driving force and gripping force.

In the liquid supply device according to one aspect of the present disclosure, one of the configurations may be such that the liquid supply device includes a pushing member configured to push the adjustment unit toward the tip of the body along the socket axis, and the adjustment unit is formed cylindrically along the socket axis and arranged movably with respect to the body along an outer circumferential surface of the body, and fixes the socket side fixing part to the plug side fixing part by pushing force of the pushing member to establish the connected state, and moves in a direction opposite to the pushing force with respect to the body to switch the connected state into the released state.

According to the liquid supply device of the present configuration, by moving the adjustment unit, which is pushed to the tip side of the body by the pushing member, in a direction opposite to the pushing force, it is possible to release the state where the socket side fixing part is fixed to the plug side fixing part. It is therefore possible to switch the connected state into the released state to detach the socket from the plug without requiring intervention of a worker.

In the liquid supply device of the above configuration, one of the aspects may be such that a recess formed annularly about the socket axis is formed in an inner circumferential side of the gripping unit, the adjustment unit is arranged to close the recess and has a flange protruding in a radial direction orthogonal to the socket axis so that the flange is in contact with a bottom surface of the recess, a first space (S1) is formed on a base end side of the body with respect to the flange, and a second space (S2) is formed on the tip side of the body with respect to the flange, and the adjustment unit switches the released state into the connected state by supplying a compressed gas to the first space and switches the connected state into the released state by supplying a compressed gas to the second space.

According to the liquid supply device of the present aspect, by supplying a compressed gas to the first space on the base end side of the body with respect to the flange of the adjustment unit, it is possible to move the flange from the base end side to the tip side of the body to switch the released state into the connected state. Further, by supplying a compressed gas to the second space on the tip side of the body with respect to the flange of the adjustment unit, it is possible to move the flange from the tip side to the base end side of the body to switch the connected state into the released state.

In the liquid supply device of the present aspect, the gripping unit may have a first cylindrical member made of metal forming the bottom surface of the recess and a second cylindrical member made of resin arranged so that the second cylindrical member is in contact with an outer circumferential surface of the first cylindrical member.

Since the first cylindrical member forming the bottom surface of the recess is made of metal, the first cylindrical member is not deformed even when high gripping force is applied by the gripping mechanism. Thus, the deformation of the first cylindrical member does not interfere with motion of the flange. Further, since the second cylindrical member is made of resin, the weight of the socket can be reduced.

In the liquid supply device according to one aspect of the present disclosure, one of the configurations may include a detection unit configured to detect the connected state and the released state.

According to the liquid supply device of the present configuration, switching from the released state to the connected state and switching from the connected state to the released state can be suitably detected by the detection unit.

In the liquid supply device of the above configuration, one of the aspects may be such that the detection unit has a magnet attached to the body and a magnetic sensor whose position on the socket axis relative to the gripping unit is fixed and which is configured to output whether or not a state where the magnet is arranged at a position close to the magnetic sensor is established, and the detection unit detects the connected state and the released state in accordance with output from the magnetic sensor.

According to the liquid supply device of the present aspect, the connected state and the released state can be suitably detected in accordance with output from the magnetic sensor configured to output whether or not a state where the magnet attached to the body is arranged at a position close to the magnetic sensor is established.

A control method of a liquid supply device according to one aspect of the present disclosure is a control method of a liquid supply device including a plug, which is fixed to an opening provided to an upper surface of a liquid storage container and has a plug side liquid channel extending along a plug axis, and a socket having a socket side liquid channel extending along a socket axis. The plug has a groove extending annularly about the plug axis and having a plug side fixing part, the socket has a body formed cylindrically along the socket axis and having the socket side liquid channel and a gripping unit formed cylindrically along the socket axis and gripped by a gripping mechanism configured to grip the socket, and a tip of the body runs annularly about the socket axis and has a socket side fixing part. The control method include: a connecting step of controlling a position on the socket axis of the body relative to the gripping unit to switch a released state where the socket side fixing part is not fixed to the plug side fixing part into a connected state where the socket side fixing part is fixed to the plug side fixing part and the socket side liquid channel is connected to the plug side liquid channel; and a releasing step of controlling a position on the socket axis of the body relative to the gripping unit to switch the connected state into the released state.

According to the control method of the liquid supply device of one aspect of the present disclosure, in the connecting step, the position on the socket axis of the body relative to the gripping unit is controlled, and thereby the released state is switched to the connected state. In the releasing step, while the tip of the body has been inserted in the groove, the position on the socket axis of the body relative to the gripping unit is controlled, and thereby the connected state is switched to the released state.

According to the control method of the liquid supply device of one aspect of the present disclosure, in the connecting step, the position on the socket axis of the body relative to the gripping unit is controlled, thereby the released state is switched to the connected state, and thus, the gripping mechanism that grips the socket is not required to apply, to the socket, driving force for fixing the socket to the plug. Further, in the releasing step, the position on the socket axis of the body relative to the gripping unit is controlled, thereby the connected state is switched to the released state, and thus, the gripping mechanism that grips the socket is not required to apply, to the socket, driving force for detaching the socket from the plug. It is therefore possible to fix the socket side fixing part of the socket to the plug side fixing part of the plug to connect the socket side liquid channel to the plug side liquid channel without using the gripping mechanism that exerts excessively large driving force and gripping force.

According to the present disclosure, it is possible to provide a liquid supply device and a control method of the liquid supply device that can fix a socket side fixing part of a socket to a plug side fixing part of a plug to connect a socket side liquid channel to a plug side liquid channel without using a gripping mechanism that exerts excessively large driving force and gripping force.

DETAILED DESCRIPTION

Figure 1:
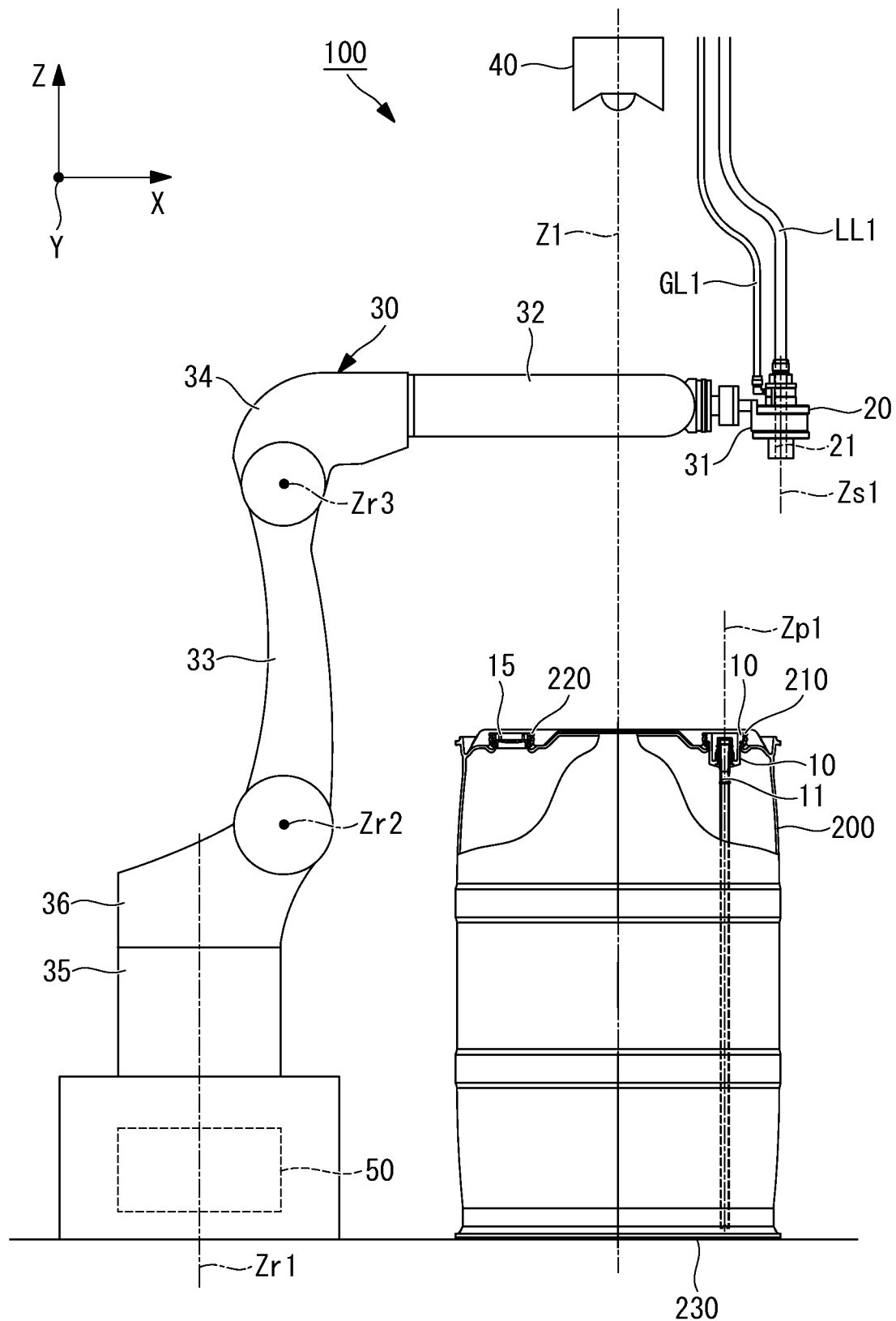
FIG. 1 is a side view illustrating a liquid supply device of one embodiment of the present disclosure and illustrates a state where a robot grips and carries a socket.
Figure 2:
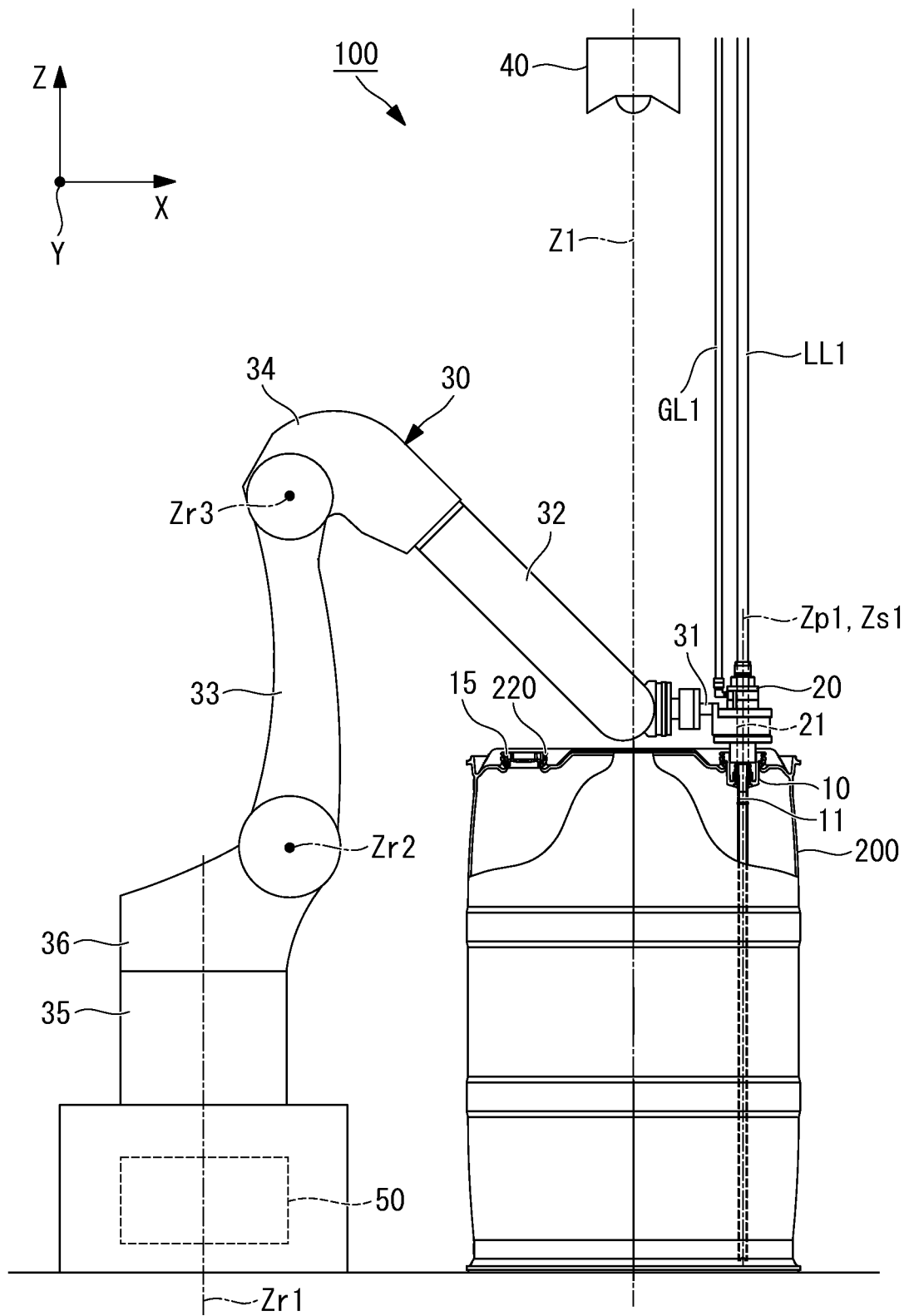
FIG. 2 is a side view illustrating a liquid supply device of one embodiment of the present disclosure and illustrates a state where the robot has arranged the socket near a plug.
Figure 3:
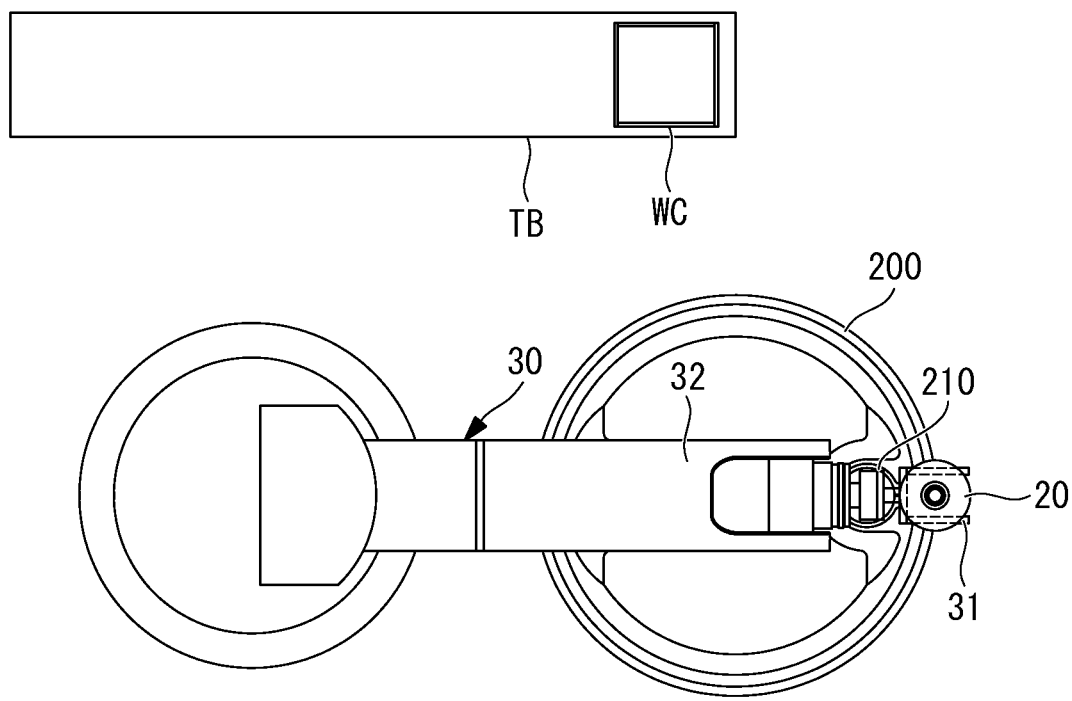
FIG. 3 is a plan view of the liquid supply device illustrated in FIG. 1 when viewed from above and illustrates a state where the robot grips and carries the socket.
Figure 3:
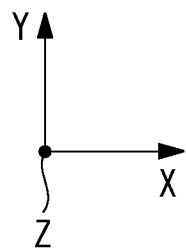

A liquid supply device 100 of one embodiment of the present disclosure will be described below with reference to the drawings. FIG. 1 and FIG. 2 are side views illustrating the liquid supply device 100 of the present embodiment. FIG. 1 illustrates a state where a robot 30 grips and carries a socket 20. FIG. 2 illustrates a state where the robot 30 has arranged the socket 20 near a plug 10. FIG. 3 is a plan view of the liquid supply device 100 illustrated in FIG. 1 when viewed from above and illustrates a state where the robot 30 grips and carries the socket 20.

The liquid supply device 100 of the present embodiment illustrated in FIG. 1 is a device that supplies a liquid contained in a liquid storage container 200 to a plurality of supply target devices (not illustrated). Herein, the liquid in the present embodiment refers to pure water or various chemical solutions used in a semiconductor manufacturing process performed by a semiconductor manufacturing apparatus, for example.

As illustrated in FIG. 1 to FIG. 3, the liquid supply device 100 has the plug (first plug) 10, a sealing stopper 15, the socket 20, the robot (gripping mechanism) 30, an image capturing unit (recognition unit) 40, and a control unit 50.

As illustrated in FIG. 1, the liquid storage container 200 is a container formed in a cylindrical shape about an axis Z1 extending in the perpendicular direction and is provided with the first opening 210 and a second opening 220 in the top face (top plate). An internal thread is formed in each inner circumferential surface of the first opening 210 and the second opening 220.

The plug 10 is fixed to the first opening 210 and has a plug side liquid channel 11 extending along a plug axis (first plug axis) Zp1. The plug side liquid channel 11 extends to a part near the bottom 230 of the liquid storage container 200. An external thread is formed in the outer circumferential surface at the upper end of the plug 10. The external thread of the plug 10 is engaged with the internal thread of the first opening 210, and thereby the plug 10 is fixed to the first opening 210.

Figure 5:
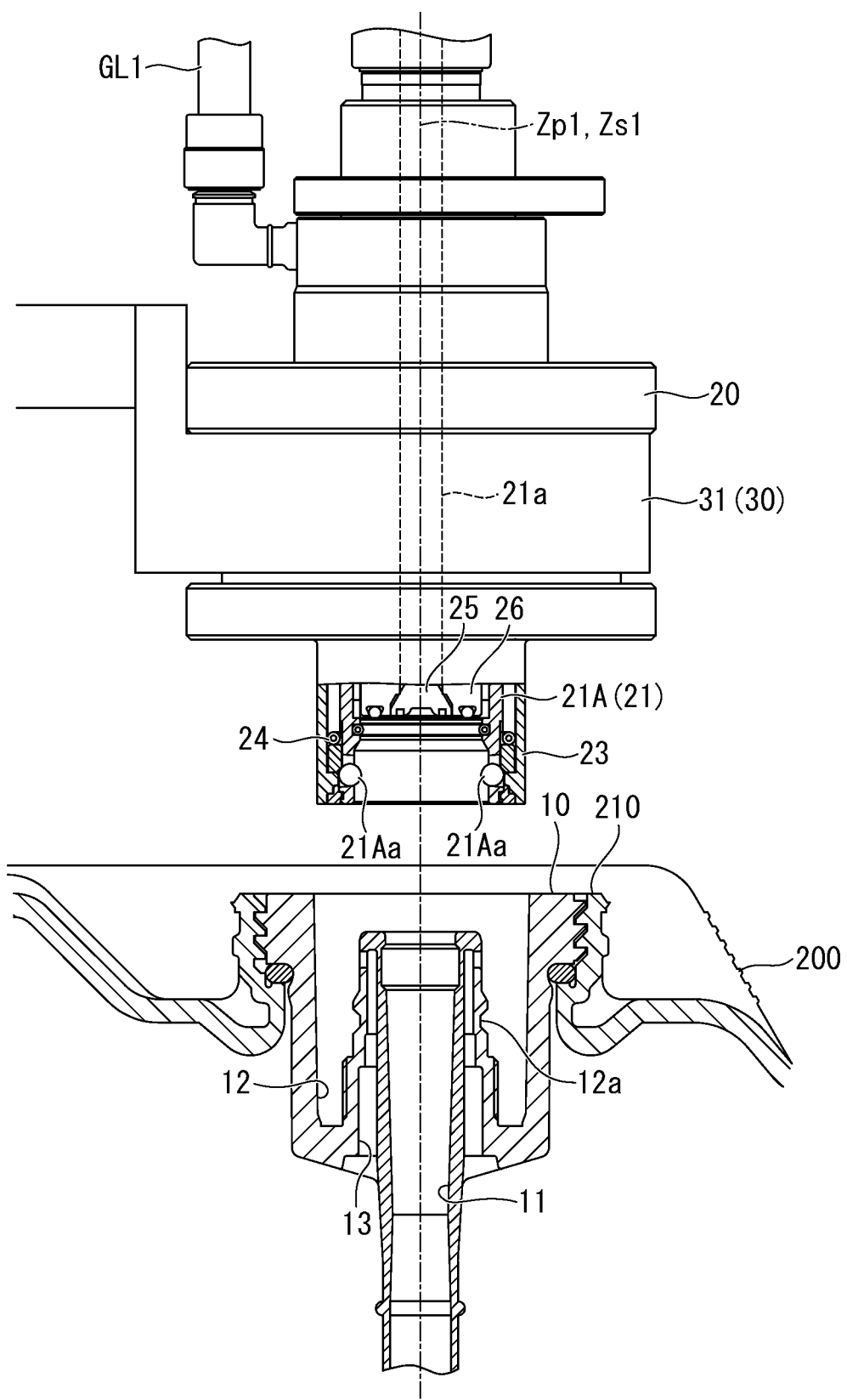
FIG. 5 is a partial sectional view illustrating a state where the socket has been moved closer to the plug.

FIG. 5 is a partial sectional view illustrating a state where the socket 20 has been moved close to the plug 10. As illustrated in FIG. 5, a groove 12 extending in an annular shape about the plug axis Zp1 is formed in the tip (upper end) of the plug 10. The groove 12 has a fixing groove (plug side fixing part) 12a used for fixing lock balls (socket side fixing part) 21Aa of the socket 20. The fixing groove 12a is formed annularly about the plug axis Zp1.

As illustrated in FIG. 2, the sealing stopper 15 is a member fixed to the second opening 220 and configured to seal the second opening 220. An external thread is formed in the outer circumferential surface of the sealing stopper 15. The external thread of the sealing stopper 15 has been engaged with the internal thread of the second opening 220, and thereby the sealing stopper 15 is fixed to the second opening 220.

The socket 20 is detachably attached to the plug 10 and has a body 21. The body 21 has a socket side liquid channel 21a extending along the socket axis Zs1. The socket 20 is connected to a liquid pipe LL1 used for supplying a liquid to a supply target device and a gas pipe GL1 used for supplying a gas to the liquid storage container 200. The socket 20 is gripped by a hand 31 of the robot 30.

As illustrated in FIG. 5, the tip (lower end) of the body 21 of the socket 20 runs annularly about the socket axis Zs1 and has a plurality of lock balls 21Aa secured in a fixing groove 12a of the plug 10. The lock balls 21Aa are arranged at multiple positions spaced apart from each other about the socket axis Zs1. The detailed structure of the socket 20 will be described later.

As illustrated in FIGS. 1 to 23, the robot 30 is a mechanism that grips the socket 20 and arranges the socket 20 in a predetermined attitude at a three-dimensional position defined by an axis X, an axis Y, and an axis Z within a motion range. The robot 30 is a six-axis articulated robot, for example. The robot 30 has the hand 31, a wrist 32, a first arm 33, a second arm 34, a base part 35, and a turning body 36.

The turning body 36 is rotatably supported about an axis Zr1 perpendicular to the base part 35. The first arm 33 is rotatably supported with respect to the turning body 36 about a horizontal axis Zr2. The second arm 34 is rotatably supported with respect to the first arm 33 about a horizontal axis Zr3. The wrist 32 is attached to the second arm 34 at one end and attached to the hand 31 at the other end.

It is possible to arrange the wrist 32 at any three-dimensional position within the motion range of the wrist 32 by combining the rotational operation of the turning body 36 with respect to the base part 35, the rotational operation of the first arm 33 with respect to the turning body 36, and the rotational operation of the second arm 34 with respect to the first arm 33. Further, the wrist 32 is rotatable about three axes and can take any attitude by displacing the hand 31 about the three axes.

The image capturing unit 40 is a device that captures an image of the top face of the plug 10 and recognizes the position in the three-dimensional space of the plug 10 and the orientation of the plug axis Zp1 of the plug 10. The image capturing unit 40 transfers a recognition result of the position in the three-dimensional space of the plug 10 and the orientation of the plug axis Zp1 of the plug 10 to the control unit 70.

The control unit 50 controls the robot 30 so that the socket 20 gripped by the hand 31 or the cap tool 60 is arranged in a desired attitude at a desired position based on a recognition result of the position in the three-dimensional space of the plug 10 and the orientation of the plug axis Zp1 of the plug 10 transmitted from the image capturing unit 40.

Figure 4:
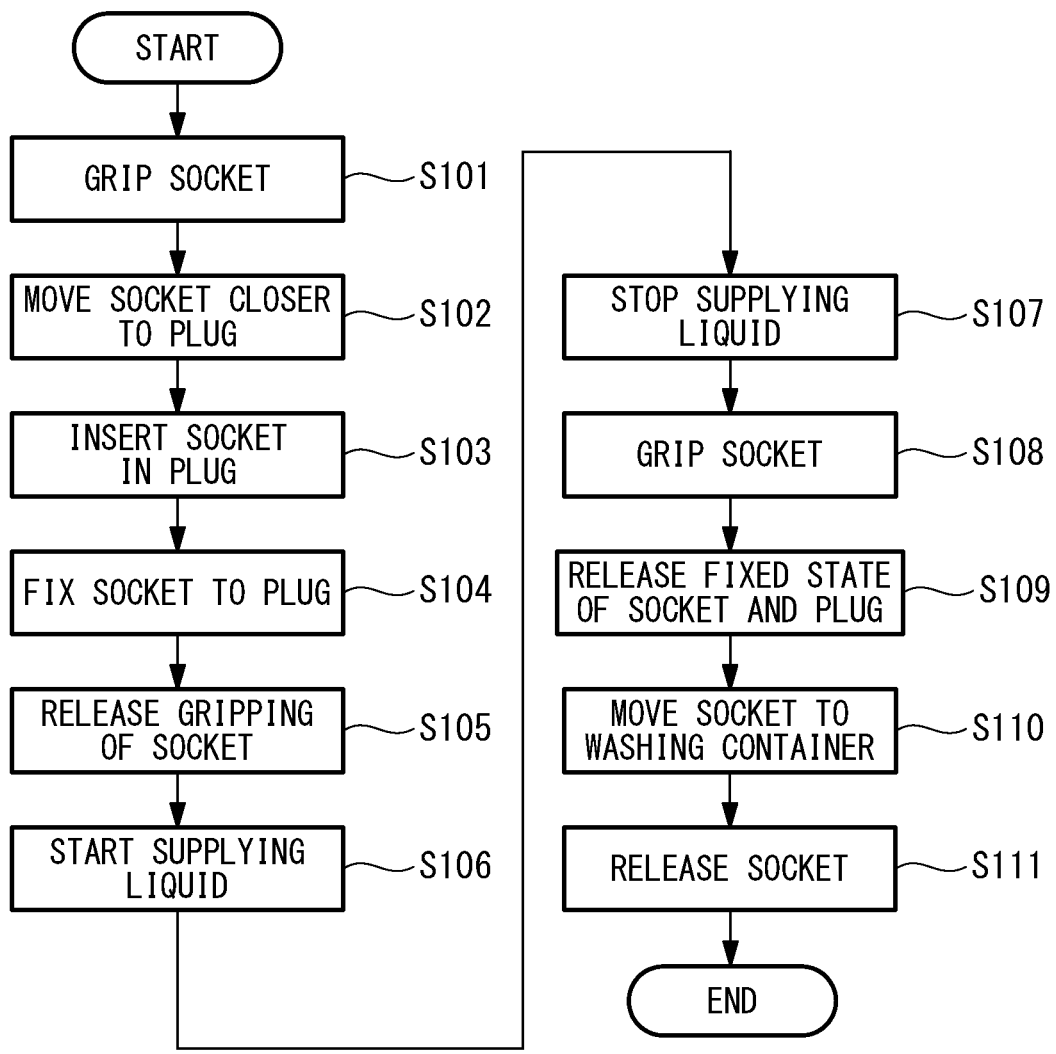
FIG. 4 is a flowchart illustrating a control method of the liquid supply device of the present embodiment.

Next, a control method of the liquid supply device 100 of the present embodiment will be described with reference to FIG. 4. FIG. 4 is a flowchart illustrating the control method of the liquid supply device 100 of the present embodiment and illustrates a process of attaching the socket 20 to the plug 10. Each process illustrated in FIG. 4 is performed when the control unit 50 performs the control program.

In step S101, the control unit 50 controls the robot 30 to grip the socket 20 installed on the installation table TB. The control unit 50 stores in advance the position of the socket 20 installed on the installation table TB and moves the hand 31 to a position near the socket 20 to grip the socket 20.

In step S102 (gripping step), the control unit 50 controls the robot 30 so that the socket 20 moves closer to the plug 10 while the hand 31 grips the socket 20. The control unit 50 controls the robot 30 so that the tip of the body 21 is arranged at a position distant at a certain distance along the plug axis Zp1 with respect to the position in the three-dimensional space of the plug 10 recognized by the image capturing unit 40. When arranging the socket 20 near the plug 10, the robot 30 adjusts the hand 31 and grips the socket 20 so that the socket 20 and the plug 10 are in the attitude where the orientation of the socket axis Zs1 matches the orientation of the plug axis Zp1 recognized by the image capturing unit 40.

In step S103 (insertion step), the control unit 50 controls the robot 30 so as to insert the tip of the body 21 of the socket 20 in the groove 12 of the plug 10. The robot 30 moves the hand 31 along the plug axis Zp1 so as to insert the tip of the body 21 into the groove 12 of the plug 10.

Figure 6:
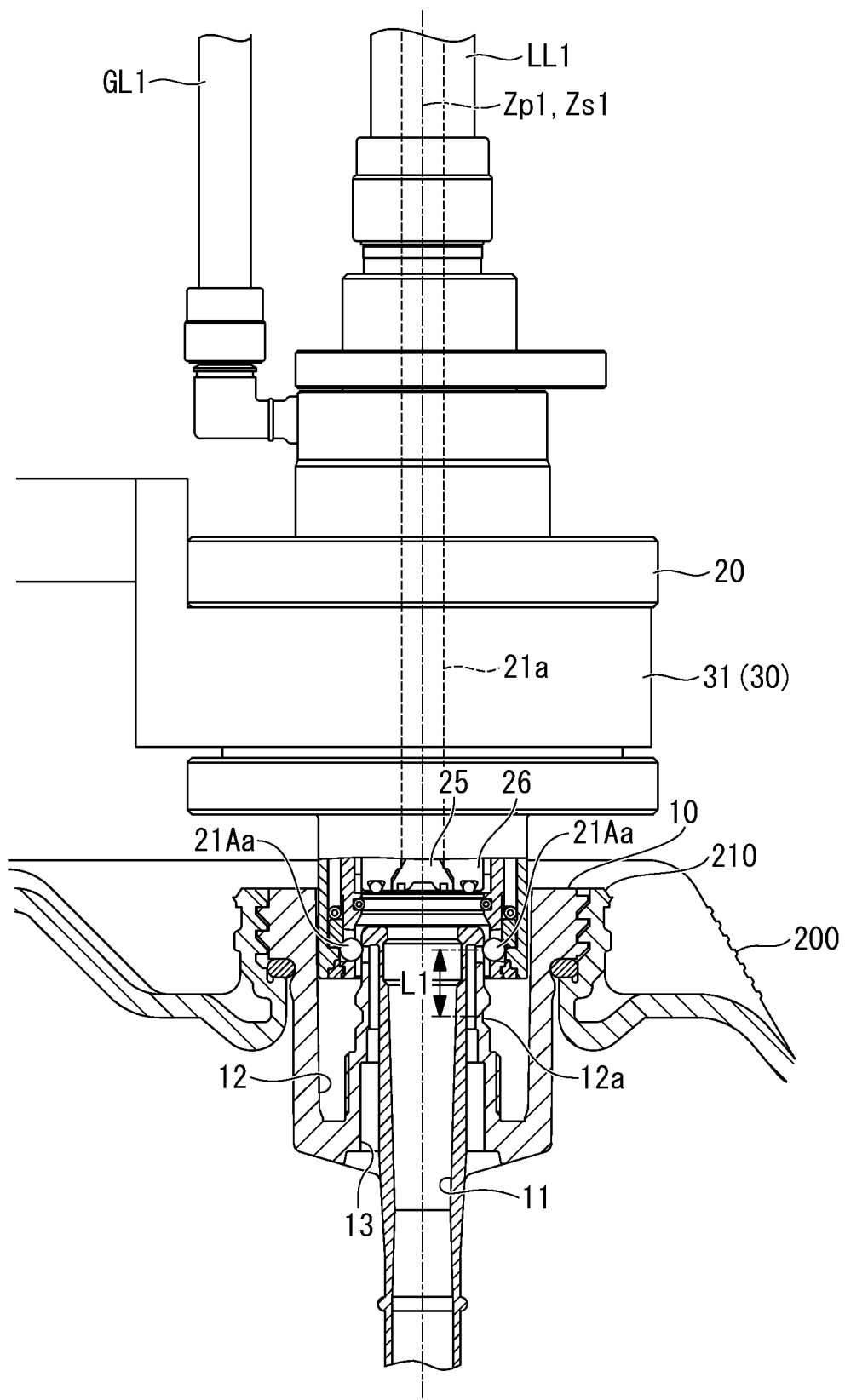
FIG. 6 is a partial sectional view illustrating a state where the socket has been inserted in the plug.

FIG. 6 is a partial sectional view illustrating a state where the socket 20 has been inserted in the plug 10. As illustrated in FIG. 6, the robot 30 inserts the tip of the body 21 in the groove 12 so that the lock balls 21Aa are arranged at positions distant by a predetermined distance (first predetermined distance) L1 from the fixing groove 12a on the plug axis Zp1. When the tip of the body 21 has been inserted in the groove 12 of the plug 10, the state illustrated in FIG. 6 is obtained.

In step S104 (connecting step), the control unit 50 controls the socket 20 so as to fix the socket 20 to the plug 10. The socket 20 has a sleeve member (adjustment unit) 23 that moves the tip of the body 21 toward the bottom of the groove 12 of the plug 10. The sleeve member 23 is a member that, while the tip of the body 21 has been inserted in the groove 12, switches the state between a connected state where the lock balls 21Aa are secured in the fixing groove 12a and a released state where the lock balls 21Aa are not secured in the fixing groove 12a.

In step S104 (connecting step), the control unit 50 controls the position on the socket axis Zs1 of the tip of the body 21 relative to the hand 31 of the robot 30 while the tip of the body 21 has been inserted in the groove 12 and thereby switches the released state into the connected state. When a detection unit 29 described later detects the connected state, the control unit 50 recognizes that the released state has been switched to the connected state and proceeds with the process to step S105.

Figure 7:
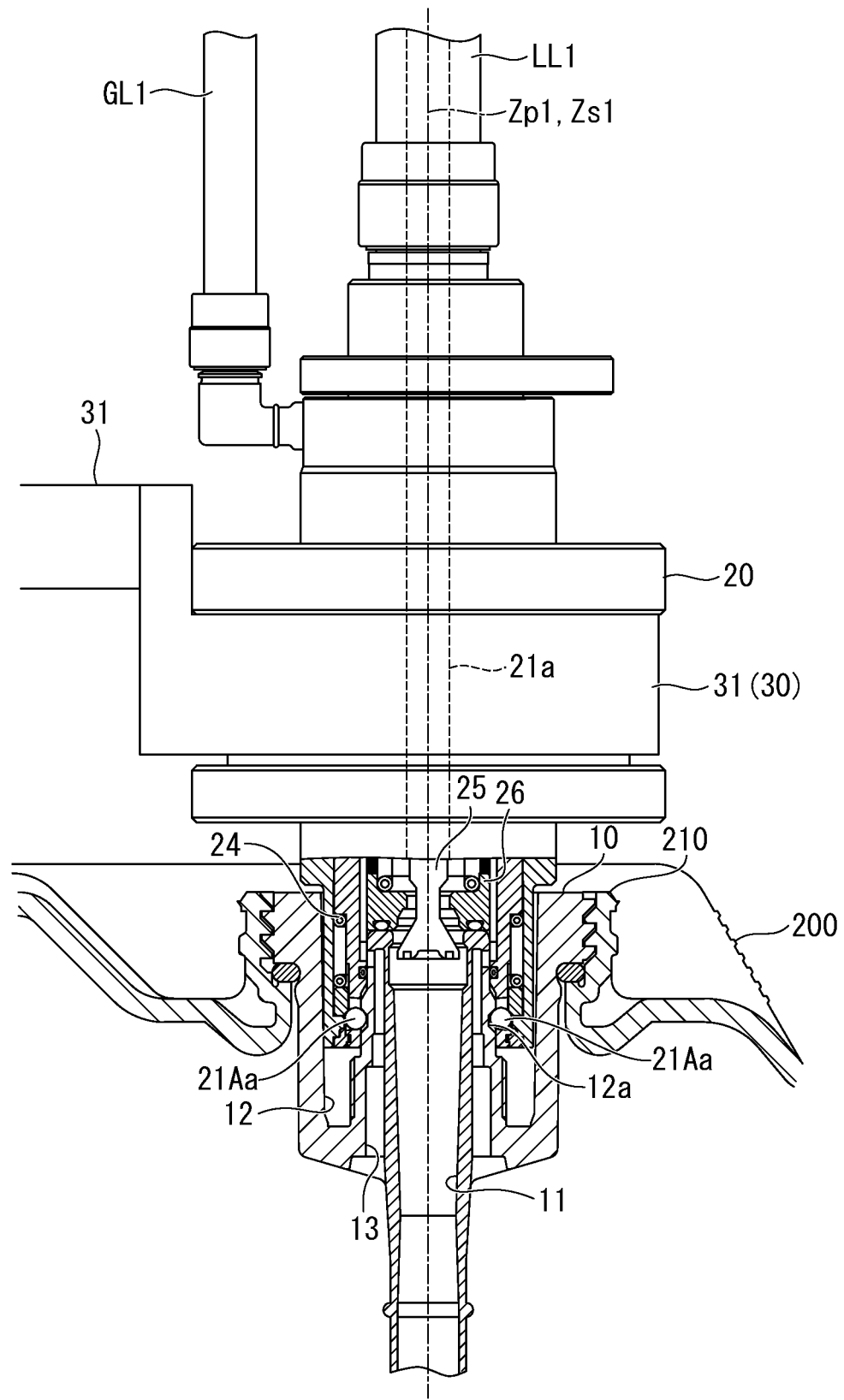
FIG. 7 is a partial sectional view illustrating a state where the socket has been fixed to the plug.

FIG. 7 is a partial sectional view illustrating a state where the socket 20 has been fixed to the plug 10. As illustrated in FIG. 7, when the lock balls 21Aa have been arranged in the fixing groove 12a, this results in a state where the lock balls 21Aa are secured in the fixing groove 12a due to pushing force of a spring 24. Thus, the state where the socket 20 is fixed to the plug 10 will be maintained unless upward force that overcomes the pushing force of the spring 24 is applied thereto.

As illustrated in FIG. 6, in a state where the lock balls 21Aa are not arranged in the fixing groove 12a, a valve 25 is in contact with a bellows 26, and the lower end of the socket side liquid channel 21a is in a sealed state. In contrast, as illustrated in FIG. 7, in the state where the lock balls 21Aa are arranged in the fixing groove 12a, the bellows 26 is in contact with the tip of the plug 10, and accordingly, the valve 25 is separated from the bellows 26. Accordingly, the sealing of the socket side liquid channel 21a is released to form the state illustrated in FIG. 7, and the socket side liquid channel 21a and the plug side liquid channel 11 are connected to each other.

In step S105, the control unit 50 controls the robot 30 to release the state where the hand 31 grips the socket 20 and move the hand 31 to a predetermined standby position.

In step S106, the control unit 50 activates a pump (not illustrated) connected to the liquid pipe LL1 to start supplying the liquid contained in the liquid storage container 200 to the supply target device. The control unit 50 controls a gas source (not illustrated) connected to the gas pipe GL1 to supply the liquid storage container 200 with a gas (for example, air or nitrogen) corresponding to the volume of the liquid extracted from the liquid storage container 200.

The gas supplied from the gas pipe GL1 to the socket 20 flows through inside of the socket 20 and is supplied to a space above the liquid storage container 200 via the plug side gas channel 13. The liquid that has reached the upper end of the plug side liquid channel 11 is guided to the liquid pipe LL1 via the socket side liquid channel 21a. The liquid guided to the liquid pipe LL1 is supplied to the supply target device. As set forth, liquid supply to the supply target device by the liquid supply device 100 is started.

While the supply of the liquid to the supply target device by the liquid supply device 100 is continued as long as the liquid in the liquid storage container 200 remains, the liquid storage container 200 is required to be replaced with a new liquid storage container 200 when the liquid in the liquid storage container 200 is depleted or reduced below a predetermined amount. Processes in step S107 to S111 are processes of detaching the socket 20 from the plug 10 to replace the liquid storage container 200.

In step S107, the control unit 50 performs control to stop the operation of the pump connected to the liquid pipe LL1 and stop supplying the gas to the socket 20 from the gas source connected to the gas pipe GL1. When the operation of the pump is stopped, the liquid supply from the liquid storage container 200 to the liquid pipe LL1 is stopped.

In step S108, the control unit 50 controls the robot 30 to move the hand 31 from a predetermined standby position to a position where the hand 31 can grip the socket 20 and to cause the hand 31 to grip the socket 20. When the hand 31 grips the socket 20, the state illustrated in FIG. 7 is obtained.

In step S109 (releasing step), the control unit 50 controls the position on the socket axis Zs1 of the body 21 relative to the gripping unit 22 while the tip of the body 21 has been inserted in the groove 12 and thereby switches the connected state into the released state. The control unit 50 adjusts the position on the socket axis Zs1 of the lock balls 21Aa relative to a gripping position gripped by the hand 31 of the robot 30 to form a state where the lock balls 21Aa are not arranged in the fixing groove 12a. When the detection unit 29 described later detects the released state, the control unit 50 recognized that the connected state has been switched to the released state and proceeds with the process to step S110.

The sleeve member 23 contracts the spring 24 by applying upward force that overcomes the pushing force of the spring 24. Once the spring 24 is contracted, the state where the lock balls 21Aa are secured in the fixing groove 12a is released, the lock balls 21Aa move to positions distant from the fixing groove 12a, and the state illustrated in FIG. 6 is obtained. The control unit 50 then controls the robot 30 so as to pull the socket 20 out of the plug 10. The robot 30 moves the hand 31 along the plug axis Zp1 so as to pull the tip of the body 21 out of the groove 12 of the plug 10.

In step S110, the control unit 50 controls the robot 30 to move the hand 31 to a washing container WC installed on an installation table TB with the hand 31 gripping the socket 20. The washing container WC stores a washing liquid (for example, pure water) that washes the liquid attached to the socket 20.

When the liquid attached to the socket 20 is a chemical solution such as slurry that is solidified upon contact with atmospheric air, by immersing the socket 20 in a washing liquid, it is possible to prevent the chemical solution from being left attached to the socket 20 and then dried and solidified. Note that it is desirable to continuously supply the washing container WC with a new washing liquid and maintain the socket 20 uncontaminated.

In step S111, the control unit 50 controls the robot 30 to release the state where the hand 31 grips the socket 20 and thereby cause the hand 31 to release the socket 20. The control unit 50 then controls the robot 30 so that the hand 31 moves to a predetermined standby position. As set forth, the operation to detach the socket 20 from the plug 10 is completed.

Next, the structure of the socket 20 will be described in detail with reference to FIG. 8 to FIG. 14. As illustrated in FIG. 8 to FIG. 14, the socket 20 has the body 21, the gripping unit 22, the sleeve member 23, the spring (pushing member) 24, the valve 25, the bellows 26, a spring 27, a support member 28, and the detection unit 29.

Figure 9:
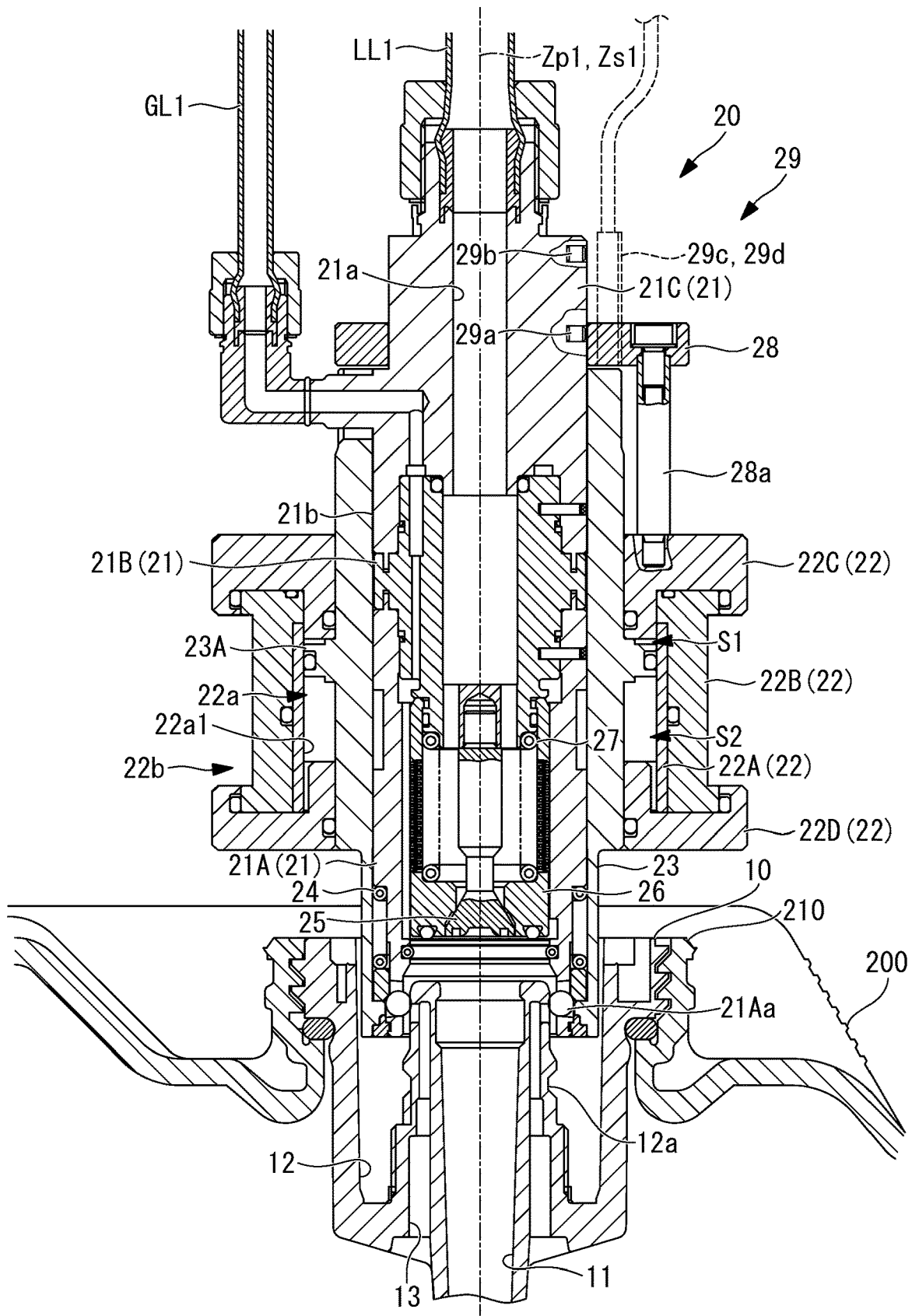
FIG. 9 is a sectional view of the socket illustrated in FIG. 8 taken along arrow A-A and illustrates a released state where the socket is not fixed to the plug.

As illustrated in FIG. 9, the body 21 has a socket body 21A, a seal core 21B, and a fitting 21C. The socket body 21A is arranged on the tip side of the body 21, and the fitting 21C is arranged on the base end side from the socket body 21A. The seal core 21B is arranged between the socket body 21A and the fitting 21C and connects the socket body 21A and the fitting 21C to each other. The body 21 is formed of a resin material (for example, a fluorine-based resin material).

The valve 25 and the bellows 26 are fixed on the body 21's tip side of the seal core 21B. The bellows 26 can be expanded and contracted along the socket axis Zs1 and is pushed by the spring 27 from the seal core 21B toward the tip of the body 21.

The gripping unit 22 is formed in substantially a cylindrical shape along the socket axis Zs1 and gripped by the hand 31 of the robot 30 configured to grip the socket 20. A recess 22a formed annularly about the socket axis Zs1 is formed on the inner circumferential side of the gripping unit 22. A recess 22b formed annularly about the socket axis Zs1 is formed on the outer circumferential side of the gripping unit 22. The recess 22b is a portion to be gripped by the hand 31.

The gripping unit 22 has a cylinder guide (first cylindrical member) 22A, a cylinder body (second cylindrical member) 22B, an upper cylinder cover 22C, and a lower cylinder cover 22D.

The cylinder guide 22A is a member extending cylindrically about the socket axis Zs1 and is formed of a metal material (for example, stainless steel). The inner circumferential surface of the cylinder guide 22A forms a bottom surface 22a1 of the recess 22a.

The cylinder body 22B is a member extending cylindrically about the socket axis Zs1 and is formed of a resin material (for example, a fluorine-based resin material). The cylinder body 22B is arranged so as to be in contact with the outer circumferential surface of the cylinder guide 22A.

The upper cylinder cover 22C is a member formed in a disc shape about the socket axis Zs1 and is formed of a resin material (for example, a fluorine-based resin material). The upper cylinder cover 22C is fixed above the cylinder body 22B and arranged in contact with the outer circumferential surface of the sleeve member 23 so as to seal the recess 22a.

The lower cylinder cover 22D is a member formed in a disc shape about the socket axis Zs1 and is formed of a resin material (for example, a fluorine-based resin material). The lower cylinder cover 22D is fixed under the cylinder body 22B and arranged in contact with the outer circumferential surface of the sleeve member 23 so as to seal the recess 22a.

The sleeve member 23 is a member formed cylindrically along the socket axis Zs1 and arranged movably with respect to the body 21 along the outer circumferential surface 21b of the body 21. The sleeve member 23 is arranged so as to close the recess 22a. The sleeve member 23 has a flange 23A protruding in a radial direction orthogonal to the socket axis Zs1 so that the flange 23A is in contact with the bottom surface 22a1 of the recess 22a.

In the recess 22a, a first space S1 is formed on the base end side (upper side) of the body 21 with respect to the flange 23A, and a second space S2 is formed on the tip side (under side) of the body 21 with respect to the flange 23A.

Figure 10:
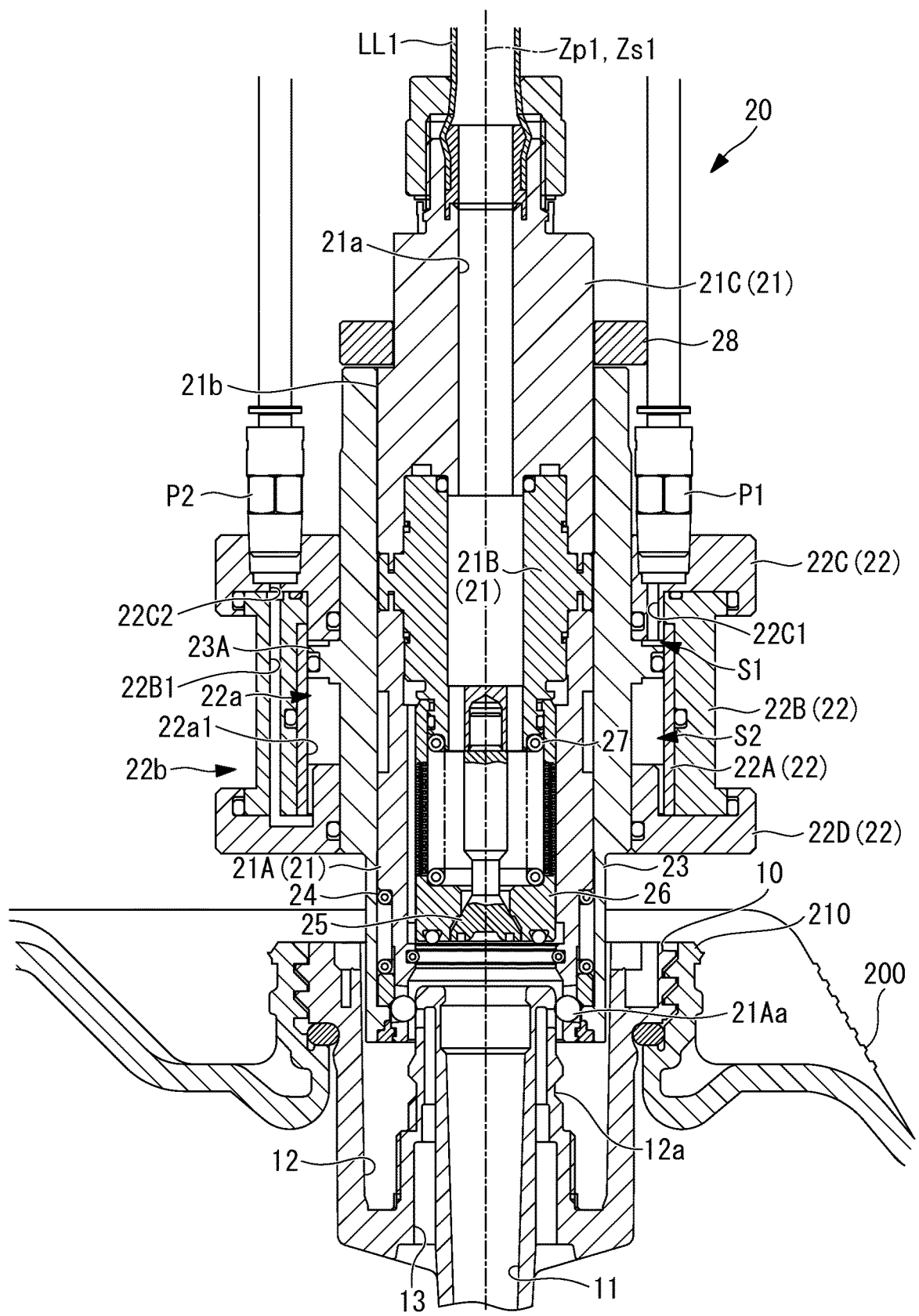
FIG. 10 is a sectional view of the socket illustrated in FIG. 8 taken along arrow B-B and illustrates a released state where the socket is not fixed to the plug.

As illustrated in FIG. 10, the first port P1 and the second port P2 are attached to the upper cylinder cover 22C. The first port P1 is supplied with compressed air from a compressed air source (not illustrated) via a first valve (not illustrated). The second port P2 is supplied with compressed air from a compressed air source via a second valve (not illustrated). The open/closed states of the first valve and the second valve are controlled by the control unit 50.

Once the control unit 50 controls the first valve into an open state and the second valve into a closed state, the first port P1 is supplied with compressed air. The compressed air supplied to the first port P1 is guided to the first space S1 via a first channel 22C1 formed in the upper cylinder cover 22C. The sleeve member 23 moves toward the plug 10 along the socket axis Zs1 due to a pressure of the compressed air supplied to the first space S1.

The sleeve member 23 moves to a position where the lock balls 21Aa are arranged in the fixing groove 12a and thereby switches the released state where the lock balls 21Aa are not secured in the fixing groove 12a into the connected state where the lock balls 21Aa are secured in the fixing groove 12a.

Figure 11:
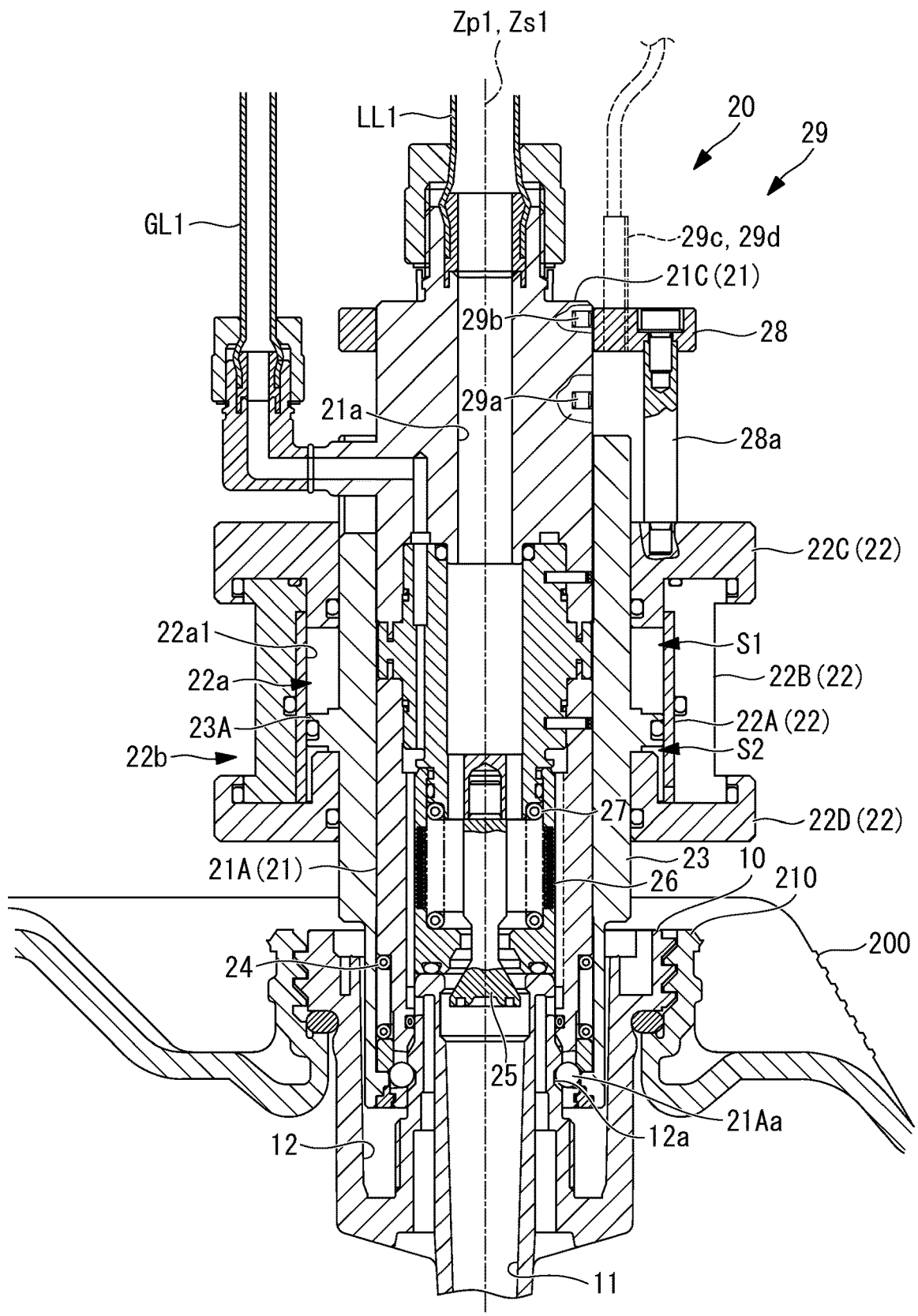
FIG. 11 is a sectional view of the socket illustrated in FIG. 8 taken along arrow A-A and illustrates a connected state where the socket is fixed to the plug.
Figure 12:
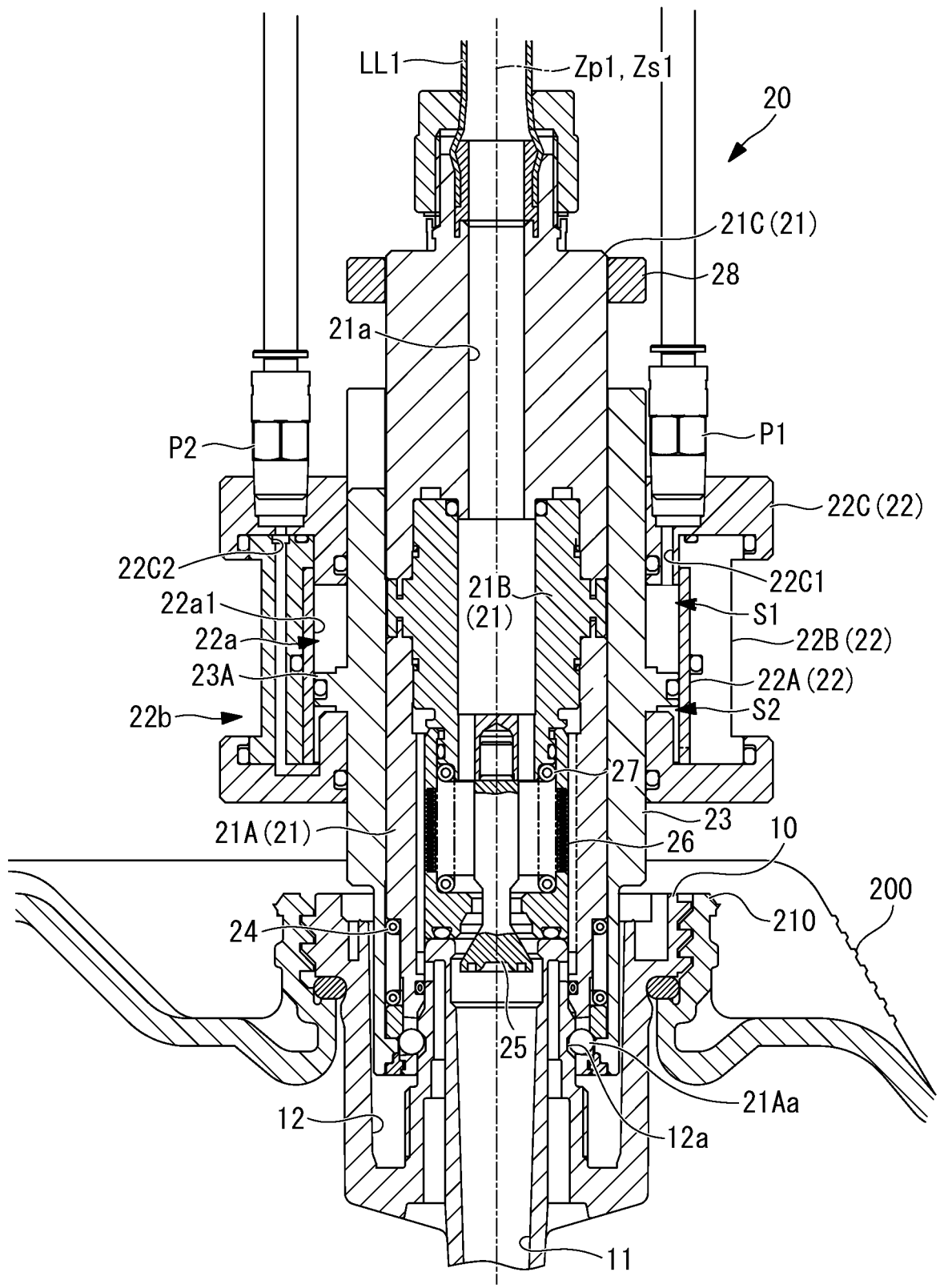
FIG. 12 is a sectional view of the socket illustrated in FIG. 8 taken along arrow B-B and illustrates the connected state where the socket is fixed to the plug.

In the connected state, the sleeve member 23 causes the lock balls 21Aa to be secured in the fixing groove 12a by the pushing force of the spring 24. The spring 24 is an elastic member that pushes the sleeve member 23 toward the tip of the body 21 along the socket axis Zs1. When the connected state is established, the state illustrated in FIG. 11 and FIG. 12 is obtained.

Figure 13:
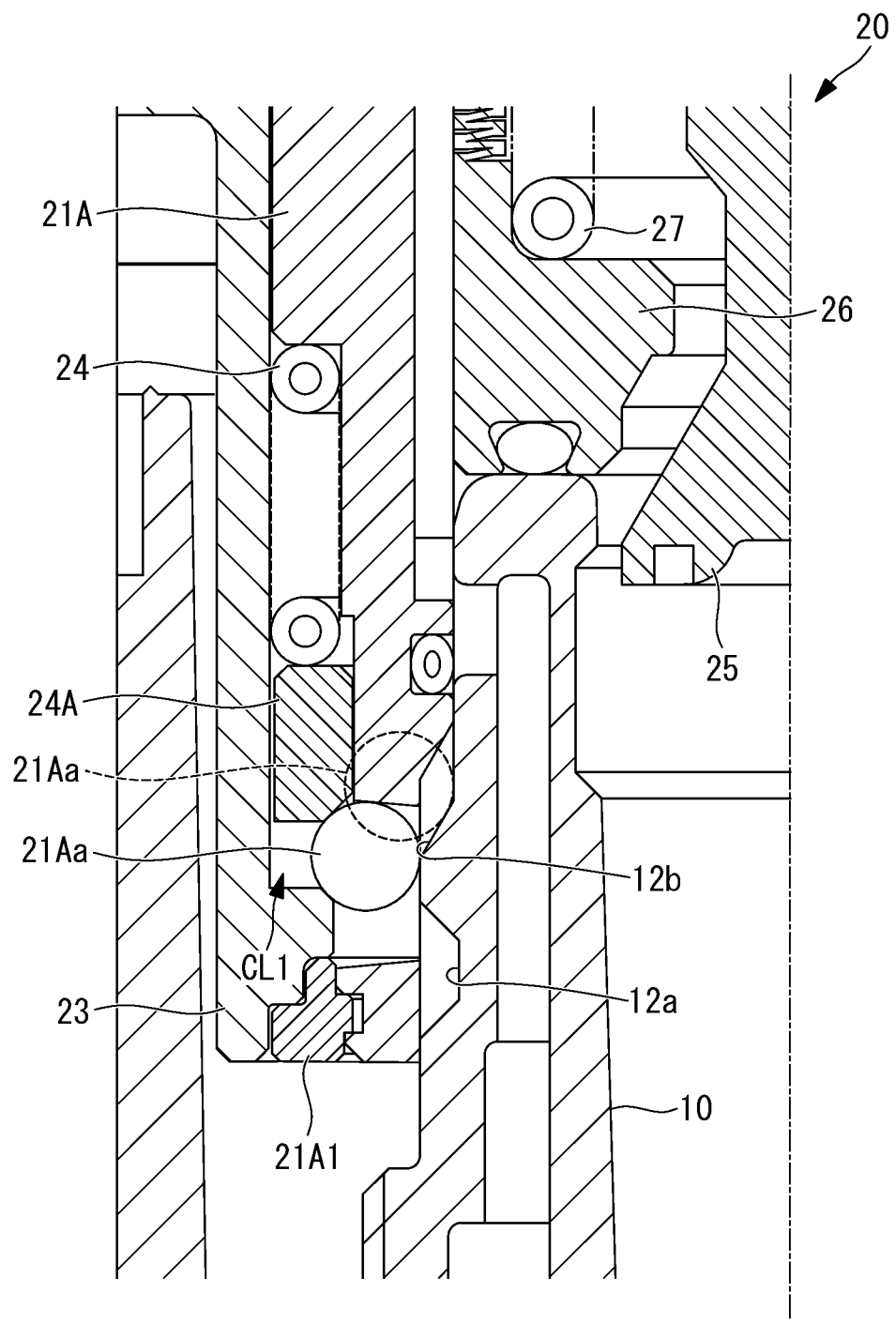
FIG. 13 is a partial longitudinal sectional view illustrating a socket and a plug when the released state is switched to the connected state.

As illustrated in FIG. 13, in switching from the released state into the connected state, when the sleeve member 23 moves toward the plug 10, the lock balls 21Aa (indicated by the dotted line) come into contact with the protrusion 12b above the fixing groove 12a. The spring 24 is then contracted as the sleeve member 23 moves downward, and a clearance CL1 is formed along the socket axis Zs1 between an annular member 24A arranged at the lower end of the spring 24 and the sleeve member 23.

The lock balls 21Aa enter the clearance CL1, move beyond the protrusion 12b, and are guided to the fixing groove 12a. Once the lock balls 21Aa are guided to the fixing groove 12a, the spring 24 is expanded, the clearance CL1 is eliminated, and the connected state where the lock balls 21Aa are secured in the fixing groove 12a is obtained.

Once the control unit 50 controls the first valve into a closed state and the second valve into an open state, the second port P2 is supplied with compressed air. The compressed air supplied to the second port P2 is guided to the second space S2 via a second channel 22C2 formed in the upper cylinder cover 22C and a channel 22B1 formed in the cylinder body 22B. The sleeve member 23 moves in a direction away from the plug 10 along the socket axis Zs1 due to a pressure of the compressed air supplied to the second space S2.

The sleeve member 23 moves in a direction opposite to the pushing force of the spring 24 with respect to the body 21 and thereby switches the connected state where the lock balls 21Aa are secured in the fixing groove 12a into the released state where the lock balls 21Aa are not secured in the fixing groove 12a. When the released state is established, the state illustrated in FIG. 9 and FIG. 10 is obtained.

Figure 14:
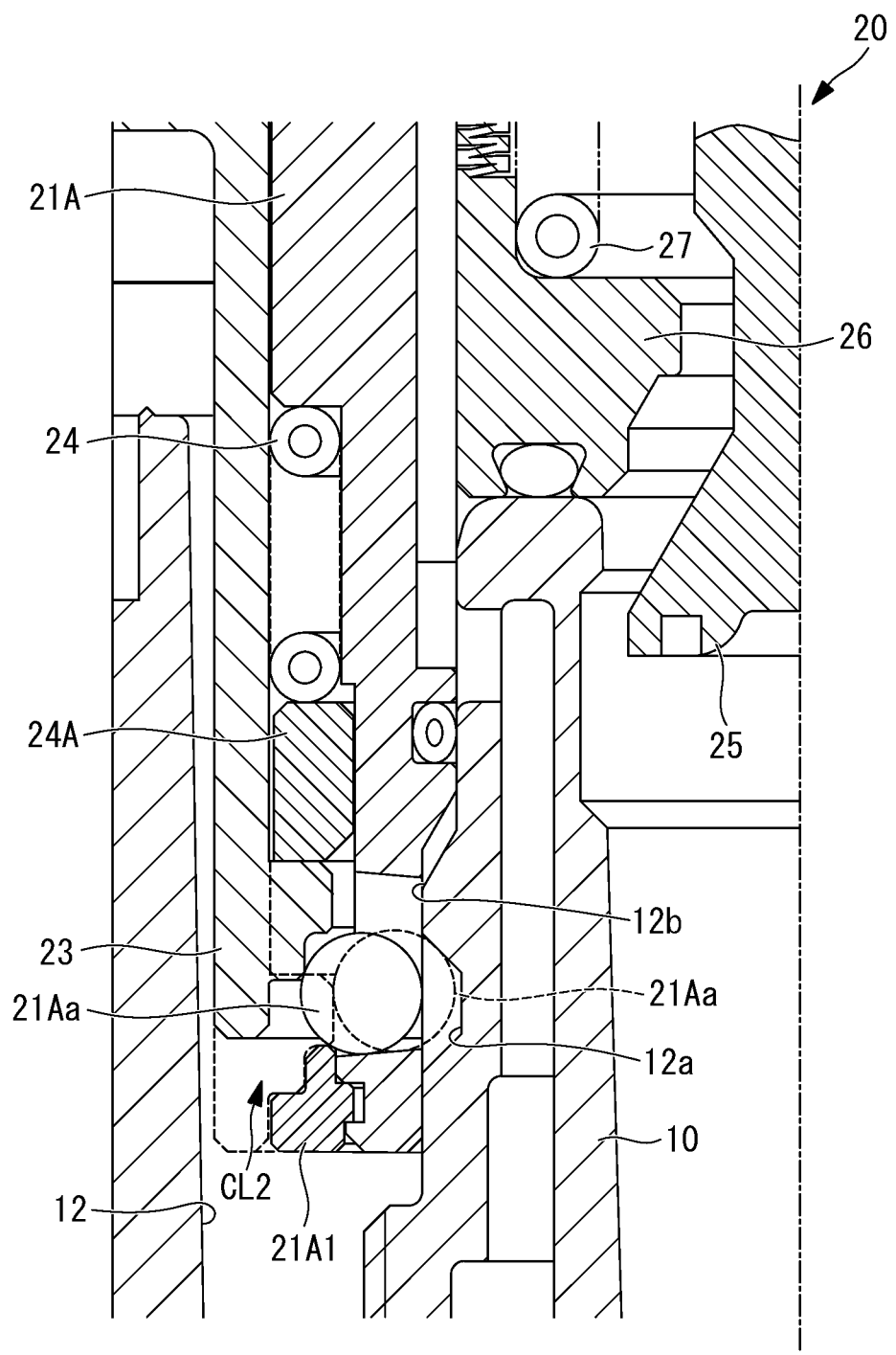
FIG. 14 is a partial longitudinal sectional view illustrating a socket and a plug when the connected state is switched to the released state.

As illustrated in FIG. 14, in switching from the connected state into the released state, when the sleeve member 23 moves in a direction away from the plug 10, the lock balls 21Aa (indicated by the dotted line) come into contact with the protrusion 12b above the fixing groove 12a. The spring 24 is then contracted as the sleeve member 23 moves upward, and a clearance CL2 is formed along the socket axis Zs1 between the sleeve member 23 and an annular member 21A1 fixed to the lower end of the socket body 21A.

The lock balls 21Aa enter the clearance CL2, move beyond the protrusion 12b, and are guided to a position indicated by the solid line in FIG. 14. The lock balls 21Aa are then guided above the protrusion 12b as the sleeve member 23 moves upward. The released state where the lock balls 21Aa are not secured in the fixing groove 12a is then established.

As illustrated in FIG. 8 to FIG. 12, the support member 28 is substantially an annular member that supports the fitting 21C of the body 21 movably along the socket axis Zs1. As illustrated in FIG. 9 and FIG. 11, the support member 28 is connected to the upper cylinder cover 22C via a bar-like connecting member 28a extending along the socket axis Zs1. When the body 21 moves with respect to the gripping unit 22 along the socket axis Zs1, the outer circumferential surface of the fitting 21C is supported by the support member 28.

The detection unit 29 is a device configured to detect the connected state where the socket side liquid channel 21a and the plug side liquid channel 11 are connected to each other and the released state where the lock balls 21Aa are not secured in the fixing groove 12a. A detection result determined by the detection unit 29 is transferred to the control unit 50.

Figure 8:
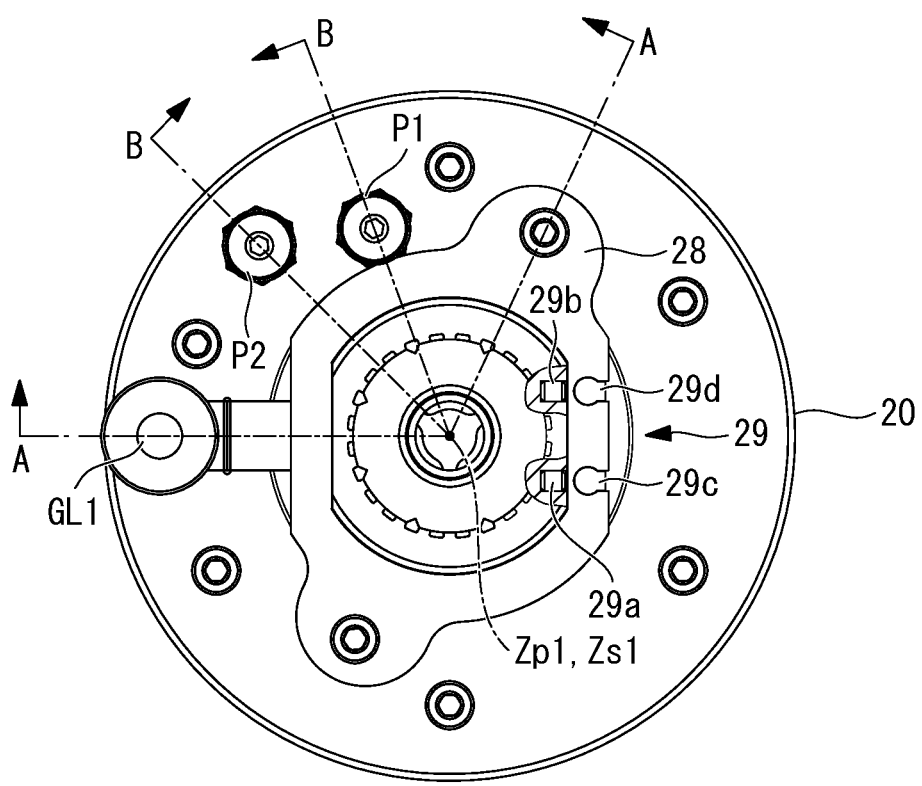
FIG. 8 is a plan view of the socket when viewed from above.

As illustrated in FIG. 8, FIG. 9, and FIG. 11, the detection unit 29 has a first magnet 29a and a second magnet 29b attached to the fitting 21C of the body 21 and a first magnetic sensor 29c and a second magnetic sensor 29d attached to the support member 28.

As illustrated in FIG. 8, the first magnet 29a and the second magnet 29b are arranged at different positions circumferentially about the socket axis Zs1. As illustrated in FIG. 9 and FIG. 11, the first magnet 29a and the second magnet 29b are arranged at different positions in a direction parallel to the socket axis Zs1. The first magnet 29a is arranged at a closer position to the gripping unit 22 than the second magnet 29b in the direction parallel to the socket axis Zs1.

The first magnetic sensor 29c is a sensor whose position on the socket axis Zs1 relative to the gripping unit 22 is fixed and which outputs whether or not a state where the first magnet 29a is arranged at a position close to the first magnetic sensor 29c is established. As illustrated in FIG. 9, the first magnetic sensor 29c outputs an on-state when the first magnet 29a is arranged at a position close to the support member 28 in the direction parallel to the socket axis Zs1.

The second magnetic sensor 29d is a sensor whose position on the socket axis Zs1 relative to the gripping unit 22 is fixed and which outputs whether or not a state where the second magnet 29b is arranged at a position close to the second magnetic sensor 29d is established. As illustrated in FIG. 11, the second magnetic sensor 29d outputs an on-state when the second magnet 29b is arranged at a position close to the support member 28 in the direction parallel to the socket axis Zs1.

When the first magnetic sensor 29c outputs the on-state and the second magnetic sensor 29d outputs the off-state, the detection unit 29 determines that the released state is established where the lock balls 21Aa are not secured in the fixing groove 12a. Further, when the first magnetic sensor 29c outputs the off-state and the second magnetic sensor 29d outputs the on-state, the detection unit 29 determines that the connected state is established where the socket side liquid channel 21a and the plug side liquid channel 11 are connected to each other. The detection unit 29 can reliably detect the released state and the connected state in accordance with a combination of the output from the first magnetic sensor 29c and the output from the second magnetic sensor 29d.

The effects and advantages achieved by the liquid supply device 100 of the present embodiment described above will be described.

According to the liquid supply device 100 of the present embodiment, the gripping unit 22 of the socket 20 is gripped by the robot 30, and the tip of the body 21 having the socket side liquid channel 21a is inserted in the groove 12 extending annularly about the plug axis Zp1. The socket 20 switches the state between the connected state where the lock balls 21Aa are secured in the fixing groove 12a and the socket side liquid channel 21a is connected to the plug side liquid channel 11 by the sleeve member 23 while the tip of the body 21 has been inserted in the groove 12 and the released state where the lock balls 21Aa are not secured in the fixing groove 12a.

According to the liquid supply device 100 of the present embodiment, since the sleeve member 23 of the socket 20 adjusts the position on the socket axis Zs1 of the body 21 relative to the gripping unit 22 and thereby the released state is switched to the connected state, the robot 30 that grips the socket 20 is not required to apply, to the socket 20, driving force for fixing the socket 20 to the plug 10. It is thus possible to secure the lock balls 21Aa of the socket 20 into the fixing groove 12a of the plug 10 to connect the socket side liquid channel 21a to the plug side liquid channel 11 without using the robot 30 that exerts excessively large driving force and gripping force.

According to the liquid supply device 100 of the present embodiment, by moving the sleeve member 23, which is pushed against the tip side of the body 21 by the spring 24, in a direction opposite to the pushing force, it is possible to release a state where the lock balls 21Aa are secured in the fixing groove 12a. It is therefore possible to switch the connected state into the released state to detach the socket 20 from the plug 10 without requiring intervention of a worker.

According to the liquid supply device 100 of the present embodiment, by supplying compressed air to the first space S1 on the base end side of the body 21 with respect to the flange 23A of the sleeve member 23, it is possible to move the flange 23A from the base end side to the tip side of the body 21 to switch the released state into the connected state. Further, by supplying a compressed gas to the second space S2 on the tip side of the body 21 with respect to the flange 23A of the sleeve member 23, it is possible to move the flange 23A from the tip side to the base end side of the body 21 to switch the connected state into the released state.

According to the liquid supply device 100 of the present embodiment, since the cylinder guide 22A forming the bottom surface 22a1 of the recess 22a is made of metal, the cylinder guide 22A is not deformed even when high gripping force is applied by the robot 30. Thus, the deformation of the cylinder guide 22A does not interfere with motion of the flange 23A. Further, since the cylinder body 22B is made of resin, the weight of the socket 20 can be reduced.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A liquid supply device comprising:
a plug fixed to an opening provided to an upper surface of a liquid storage container and having a plug side liquid channel extending along a plug axis; and
a socket detachably attached to the plug and having a socket side liquid channel extending along a socket axis,
wherein the plug has a groove extending annularly about the plug axis and having a plug side fixing part,
wherein the socket has
a body formed cylindrically along the socket axis and having the socket side liquid channel,
a gripping unit formed cylindrically along the socket axis and gripped by a gripping mechanism configured to grip the socket, and
an adjustment unit configured to adjust a position on the socket axis of the body relative to the gripping unit,
wherein a tip of the body runs annularly about the socket axis and has a socket side fixing part, and
wherein the adjustment unit switches a state between a connected state where the socket side fixing part is fixed to the plug side fixing part and the socket side liquid channel is connected to the plug side liquid channel and a released state where the socket side fixing part is not fixed to the plug side fixing part.

2. The liquid supply device according to claim 1 further comprising a pushing member configured to push the adjustment unit toward the tip of the body along the socket axis,
wherein the adjustment unit is formed cylindrically along the socket axis and arranged movably with respect to the body along an outer circumferential surface of the body, fixes the socket side fixing part to the plug side fixing part by pushing force of the pushing member to establish the connected state, and moves in a direction opposite to the pushing force with respect to the body to switch the connected state into the released state.

3. The liquid supply device according to claim 2,
wherein a recess formed annularly about the socket axis is formed in an inner circumferential side of the gripping unit,
wherein the adjustment unit is arranged to close the recess and has a flange protruding in a radial direction orthogonal to the socket axis so that the flange is in contact with a bottom surface of the recess,
wherein a first space is formed on a base end side of the body with respect to the flange, and a second space is formed on the tip side of the body with respect to the flange, and
wherein the adjustment unit switches the released state into the connected state by using a pressure of a compressed gas supplied to the first space and switches the connected state into the released state by using a pressure of a compressed gas supplied to the second space.

4. The liquid supply device according to claim 3, wherein the gripping unit has
a first cylindrical member made of metal forming the bottom surface of the recess, and
a second cylindrical member made of resin arranged so that the second cylindrical member is in contact with an outer circumferential surface of the first cylindrical member.

5. The liquid supply device according to claim 1, further comprising a detection unit configured to detect the connected state and the released state.

6. The liquid supply device according to claim 5, wherein the detection unit has a magnet attached to the body and a magnetic sensor whose position on the socket axis relative to the gripping unit is fixed and which is configured to output whether or not a state where the magnet is arranged at a position close to the magnetic sensor is established, and the detection unit detects the connected state and the released state in accordance with output from the magnetic sensor.

7. A control method of a liquid supply device comprising a plug, which is fixed to an opening provided to an upper surface of a liquid storage container and has a plug side liquid channel extending along a plug axis, and a socket having a socket side liquid channel extending along a socket axis,
wherein the plug has a groove extending annularly about the plug axis and having a plug side fixing part,
wherein the socket has
a body formed cylindrically along the socket axis and having the socket side liquid channel, and
a gripping unit formed cylindrically along the socket axis and gripped by a gripping mechanism configured to grip the socket
wherein a tip of the body runs annularly about the socket axis and has a socket side fixing part,
the control method comprising:
a connecting step of controlling a position on the socket axis of the body relative to the gripping unit to switch a released state where the socket side fixing part is not fixed to the plug side fixing part into a connected state where the socket side fixing part is fixed to the plug side fixing part and the socket side liquid channel is connected to the plug side liquid channel; and
a releasing step of controlling a position on the socket axis of the body relative to the gripping unit to switch the connected state into the released state.

* * * * *